Oct. 21, 1924.
C. W. BROWN
BRAKE LINING
Filed June 21, 1922
1,512,451
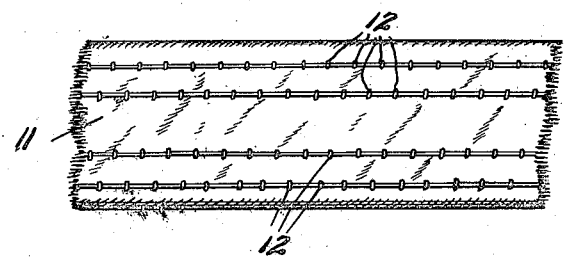
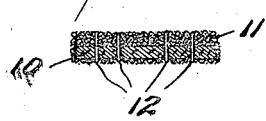 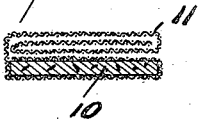 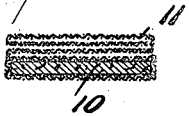
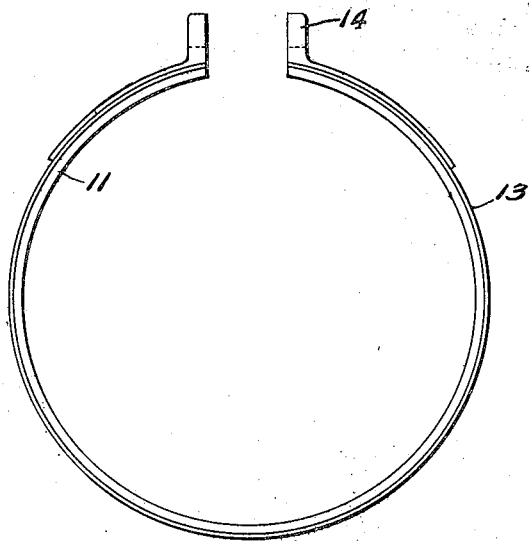 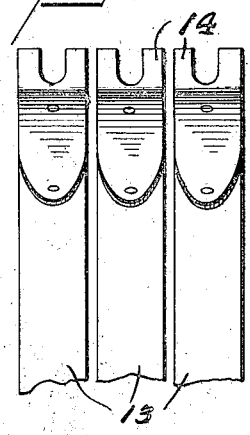
Inventor
Charles W. Brown
By Walter W. Burns
Attorney Patented Oct. 21, 1924.

1,512,451

UNITED STATES PATENT OFFICE.

CHARLES W. BROWN, OF NASHVILLE, TENNESSEE.

BRAKE LINING.

Application filed June 21, 1922. Serial No. 569,869.

*To all whom it may concern:*

Be it known that I, CHARLES W. BROWN, residing at Nashville, county of Davidson, State of Tennessee, a citizen of the United States, have invented certain new and useful Improvements in Brake Linings, of which the following is a specification.

This invention relates to brake linings and is particularly adapted for use on the brake and transmission bands on automobiles of a popular make.

Great difficulty is experienced in the operation of some brake bands, particularly the brake and transmission bands of Ford automobiles due to the tendency of the linings to "grab," thus causing the wheels to skid, or to "chatter" thus causing undue vibration to the engine and to the machine as a whole.

It is the primary object of this invention to provide an improved brake lining which is so constructed as to prevent both "chatter" and "grabbing" and which will be efficient and effective to stop its drum and one which will have a long life.

Another object of my invention is the provision of a brake lining having a resilient body portion as of sheet cork or some similar acting substance and a protecting wear surface of a heavy flexible material such as canvas and so formed as to permit the wearing away of one or more layers without having the brake drum in contact with the resilient body portion.

Referring to the drawing where preferred embodiments of my invention are illustrated, Fig. 1 is a longitudinal view of a section of my brake lining as viewed from the drum side.

Fig. 2 is a cross sectional view showing the drum side uppermost.

Fig. 3 is a view showing the parts in place and folded before being fastened together.

Fig. 4 is a view similar to Fig. 3 but showing a modified form.

Fig. 5 is a view showing the brake lining in place in the band and ready for installation.

Fig. 6 is a view of three brake bands as they would appear in place on a Ford automobile.

Referring particularly to Figs. 1 and 2, 10 designates a strip of flexible body portion such as of cork or a similar substance. About this body portion 10 is a sheet of covering and drum contacting material such as heavy canvas 11. This covering and drum contacting material is cut of a length substantially equal to the length of the brake lining and of a width several times that of the body portion 10. The cover 11 is folded in any suitable manner as by having the outer lap fold up, over and under twice, (as at the left in Fig. 3) while the other (right) side is folded under adjacent the body portion 10. Another way of placing the folds is as shown in Figure 4 where the cover comes up on the one (left) side, folds over to the opposite side and back again on the outside and then letting the edge go under. After the folds are complete, the whole is fastened together in a suitable manner as for example, by the several rows of stitching 12 shown in Fig. 2.

In Figure 5, I have shown the brake lining in place within the brake band 13, at the ends of which are illustrated the lugs 14 whereby the brake bands are caused to grip their respective drums.

The position of the cork strip under the folds of heavy covering material, provides resiliency for the cover, thereby causing the pressure to be distributed. Since the cork does not come into contact with the brake drum, it does not burn out as is common in some other types of brake linings.

While I have described and claimed my invention as using canvas and cork in its construction, I desire to have it understood that any materials having similar characteristics may be used in place of the ones described.

While I have described, in detail, embodiments of my invention, I desire to have it understood that I do not limit myself to the exact structures described and that modifications and changes may be made without departing from the spirit of my invention and within the scope of the appended claims.

Having described my invention, what I claim is:—

1. A brake lining, comprising a non-metallic resilient body portion, a flexible friction contacting portion between the body portion and the drum side of the lining.

2. A brake lining, comprising a non-metallic resilient body portion, a flexible cover for the body portion for contacting with the drum.

3. A brake lining comprising a body portion of cork, a flexible brake-drum contacting cover for the same.

4. A brake lining, comprising a body portion of cork, a flexible cover for the body portion having a plurality of layers of folds between the wear surface and the body portion.

5. A brake lining, comprising a body portion of cork, a flexible cover for the body portion having a plurality of layers of folds between the wear surface and the body portion and means for securing the folds and body portion together.

6. A brake lining, comprising a body portion of cork, a plurality of thicknesses of fabric between the body portion and the drum side of the lining.

In testimony whereof I hereunto affix my signature.

CHARLES W. BROWN.